Patented Oct. 9, 1928.

1,686,992

UNITED STATES PATENT OFFICE.

BERTHOLD STEIN, OF ELBERFELD, GERMANY, ASSIGNOR TO GRASSELLI DYESTUFF CORPORATION, OF NEW YORK, N. Y., A CORPORATION OF DELAWARE.

PROCESS OF MAKING TETRA-NITRO-DIANTHRONE.

No Drawing. Application filed June 28, 1926, Serial No. 119,200, and in Germany June 25, 1925.

My invention consits in tetra-nitro-dianthranol and in the process of making the same.

Dianthrone of the formula:

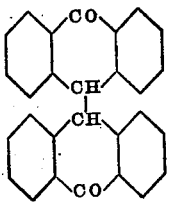

has always been considered as an exceedingly stable compound, and only very few reactions are known by which this dianthrone can be transformed into other compounds. It is, for instance, stated by H. Meyer (Wiener Monatschefte für Chemie vol. 30, page 165) that it can be easily purified by recrystallization from concentrated nitric acid.

I have now found that if dianthrone is treated in concentrated sulfuric acid with nitric acid, a tetra-nitro-dianthrone is obtained in which the nitro groups are attached to beta positions. This tetra-nitro-dianthrone is obtained as colorless crystals which are difficultly soluble in concentrated sulfuric acid. It is hardly attacked by acid reducing agents. Boiled up in pyridine a green solution is obtained, which becomes quickly brown. On cooling dark needles are separated, which are supposed to be the pyridine salt of the tera-nitro-dianthranol. The tetra-nitro-dianthrone is intended to be used as intermediate product in the manufacture of dyestuffs and other compounds.

The following example will further illustrate my invention:

*Example.*—50 grams powdered dianthrone are with good stirring introduced at a temperature of from 0 to 5° C. into 190 cc. of a mixture of strong nitric and sulfuric acids containing 0.2 grams nitric acid per cubic centimeter.

The dianthrone is at first dissolved with yellow color but even before all of it has been introduced, colorless crystals start to separate, the amount of which gradually increases. After all of the dianthrone has been introduced, the reaction is allowed to stir for another four hours, and is then filtered over asbestos or glass wool, washed at first with a 60° Bé. sulfuric acid and then to neutrality with hot water. The yield is excellent, being between 90 and 92% of theory. The tetra-nitro-dianthrone is obtained in this way as colorless crystals. It is very difficultly soluble in concentrated sulfuric acid and in most organic solvents. Acid reduction agents hardly attack it, whereas through alkaline agents it can be reduced to a tetra-amido-dianthrone. Boiled up with pyridine or weak alkaline agents, such as aniline or weak aqueous alcoholic caustic, salts of the tetra-nitro-diantranol are obtained, which may be represented by the formula:

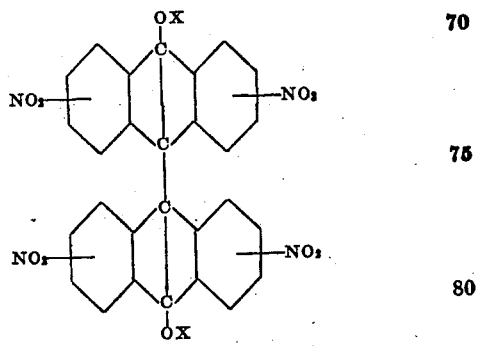

in which X is a basic radicle.

I claim:

1. The process of making tetra-nitro-dianthrone which comprises reacting dianthrone with a nitrating agent in the presence of concentrated sulfuric acid.

2. The process of making tetra-nitro-dianthrone which consists in treating dianthrone with a mixture of strong nitric and sulfuric acids.

3. The process of making tetra-nitro-dianthrone which consists in treating dianthrone with a mixture of strong nitric and sulfuric acids at temperatures below room temperature.

4. As a new compound, tetra-nitro-dianthrone in which the nitro groups are attached in a beta position, which is obtained in the form of colorless crystals difficultly soluble in concentrated sulfuric acid and in most organic solvents and which by weak alkaline agents is transformed into salts of the isomeric tetra-nitro-dianthranol.

In testimony whereof I have hereunto set my hand.

BERTHOLD STEIN.